(12) United States Patent
Nassoiy

(10) Patent No.: US 8,861,202 B2
(45) Date of Patent: Oct. 14, 2014

(54) INTEGRATED THERMAL AND STRUCTURAL MANAGEMENT SOLUTION FOR RECHARGEABLE ENERGY STORAGE SYSTEM ASSEMBLY

(75) Inventor: Mathew L. Nassoiy, Milford, MI (US)

(73) Assignee: GM Global Technology Operations LLC, Detroit, MI (US)

(*) Notice: Subject to any disclaimer, the term of this patent is extended or adjusted under 35 U.S.C. 154(b) by 167 days.

(21) Appl. No.: 13/269,708

(22) Filed: Oct. 10, 2011

(65) Prior Publication Data

US 2012/0087091 A1 Apr. 12, 2012

Related U.S. Application Data

(60) Provisional application No. 61/391,823, filed on Oct. 11, 2010.

(51) Int. Cl.
| | |
|---|---|
| H02B 1/00 | (2006.01) |
| H02B 1/56 | (2006.01) |
| H05K 7/20 | (2006.01) |
| G06F 1/20 | (2006.01) |
| H05K 5/00 | (2006.01) |
| F28F 7/00 | (2006.01) |
| F28D 15/00 | (2006.01) |
| H01L 23/34 | (2006.01) |
| H01B 9/06 | (2006.01) |
| H02G 3/03 | (2006.01) |
| B60K 11/00 | (2006.01) |
| B60R 16/04 | (2006.01) |
| B60K 1/00 | (2006.01) |
| H01M 10/6568 | (2014.01) |
| H01M 10/6554 | (2014.01) |
| H01M 10/6556 | (2014.01) |

(52) U.S. Cl.
CPC ...... *H01M 10/5053* (2013.01); *H01M 10/5077* (2013.01); *H01M 10/5057* (2013.01)
USPC . 361/701; 361/676; 361/679.46; 361/679.47; 361/679.53; 361/679.54; 361/688; 361/689; 361/690; 361/691; 361/692; 361/693; 361/694; 361/695; 361/696; 361/697; 361/699; 361/702; 361/703; 361/704; 361/709; 361/710; 361/711; 165/80.4; 165/80.5; 165/104.33; 257/714; 174/15.1; 180/68.1; 180/68.5; 180/65.1

(58) Field of Classification Search
USPC .............. 361/701, 702–704, 688–699, 676, 361/679.46, 679.47, 679.53, 679.54, 361/709–711; 165/80.4, 80.5, 104.33; 257/714; 174/15.1; 180/68.1, 68.5, 180/65.21, 65.1
See application file for complete search history.

(56) References Cited

U.S. PATENT DOCUMENTS

2008/0265586 A1* 10/2008 Like et al. ............... 290/38 R
2009/0059528 A1* 3/2009 Damsohn et al. ............ 361/701

* cited by examiner

*Primary Examiner* — Anthony Haughton
*Assistant Examiner* — Zhengfu Feng
(74) *Attorney, Agent, or Firm* — Dinsmore & Shohl LLP

(57) ABSTRACT

A thermal management component for a Rechargeable Energy Storage Systems (RESS) assembly and a method of managing the temperature of a RESS battery module using the component are disclosed. The thermal management component comprises (i) a frame having a chamber defined therein; and (ii) a heat exchange plate in mechanical communication with at least a portion of the frame. The method comprises (a) providing a thermal management component as described herein; and (b) circulating at least one heat transfer fluid through said component.

19 Claims, 4 Drawing Sheets

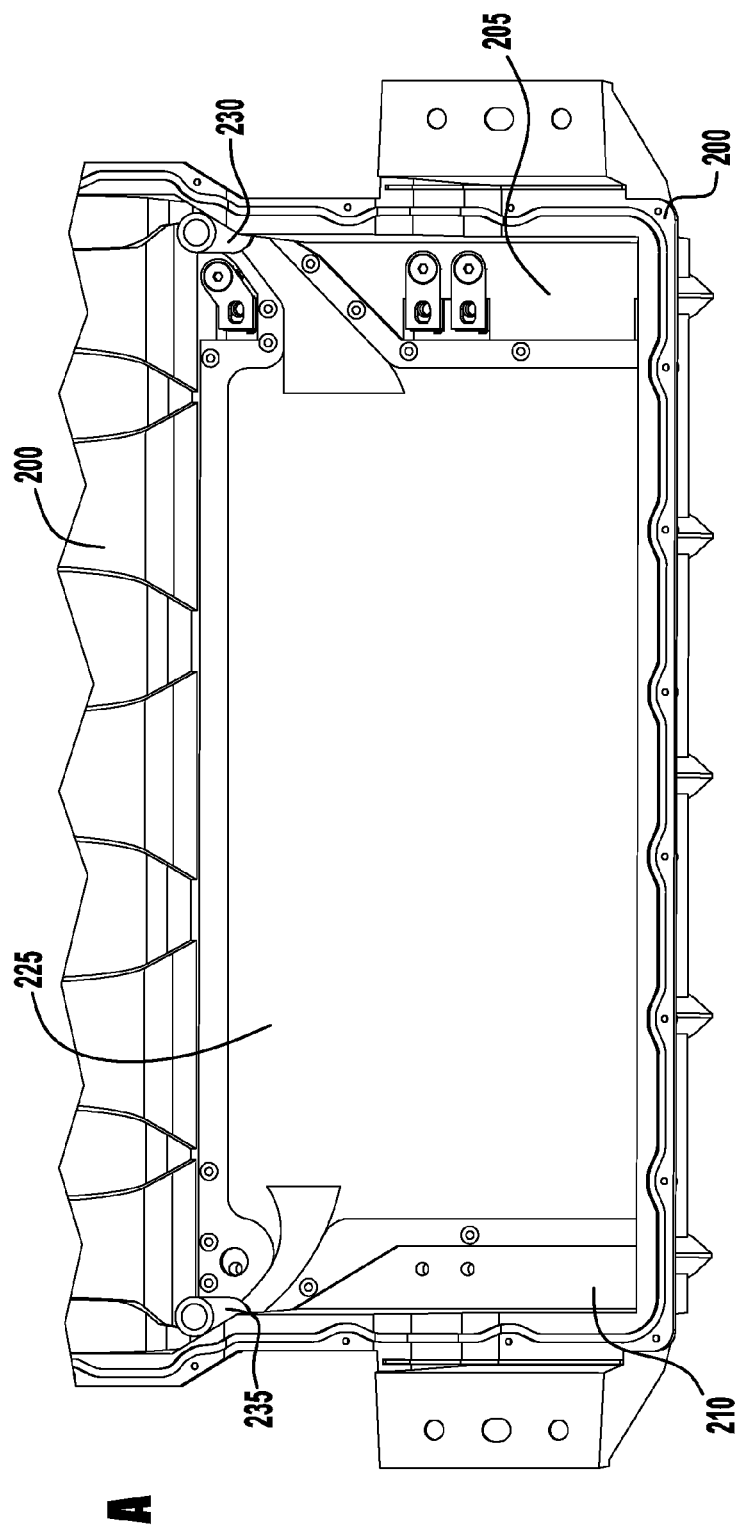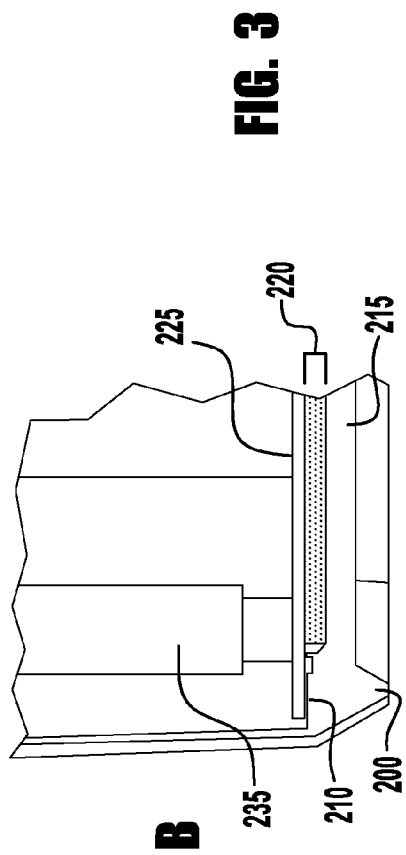
FIG. 3

INTEGRATED THERMAL AND STRUCTURAL MANAGEMENT SOLUTION FOR RECHARGEABLE ENERGY STORAGE SYSTEM ASSEMBLY

CROSS REFERENCE TO RELATED APPLICATIONS

This application claims priority to and any other benefit of U.S. Provisional Application Ser. No. 61/391,823, filed Oct. 11, 2010, the entirety of which is incorporated by reference herein.

BACKGROUND

The present application relates to providing thermal management for battery modules that need to be cooled or heated.

Hybrid and electric vehicles provide an alternative to conventional means of vehicular motive power by either supplementing (in the case of hybrids) or completely replacing (in the case of electric vehicles) the internal combustion engine (ICE). In such hybrid or electric vehicle configurations, at least a portion of the motive power is provided by one or more battery packs that act as a direct current (DC) voltage source to a motor, generator, or transmission that in turn can be used to provide the energy needed to rotate one or more of the vehicle's wheels. One valuable feature of a battery pack configuration for vehicle propulsion is that they are rechargeable, such as through a conventional 120/240 volt alternating current (AC) electric outlet. Such battery pack configurations are known as Rechargeable Energy Storage Systems (RESS), which may be configured as one or more modules made up of a series of individual batteries.

RESS assemblies require thermal management in order to maintain performance and integrity. Under certain circumstances, charging or operation of batteries of the RESS at too high of a temperature can decrease the life of the batteries. Similarly, under certain circumstances, charging or operation of batteries at too low of a temperature can cause permanent battery damage. Therefore, in order to overcome the possibility of such events and to promote increased battery efficiency, conventional thermal management systems have been developed.

In one conventional configuration of a thermal management system, the RESS is positioned in a frame that may additionally include cooling fins, paths or channels for cooling liquid for the various cells of the battery pack. In such design, a cold plate is made from an extruded aluminum structure that is subsequently cut and machined together with a header assembly to provide cooling path turns that are machined or otherwise formed within the plate. Such design of the cold plate requires multiple pieces and tight tolerances during manufacture to (among other things) maintain plate flatness.

As one example of the thermal management approach of a conventional RESS thermal management system, reference is made to FIG. 1. The approach is configured as an assembly of multiple plates (for example, a front plate 10 and a rear plate 15) thermally connected to one another by a coolant conduit 55 that forms a cooling path. The front cooling plate 10 is made of upper and lower plate sections 20, 25, and the rear cooling plate 15 is made of upper and lower plate sections 30, 35. Between the upper and lower plate sections 20, 25 of the front cooling plate 10 are a series of channels 40 through which the coolant flows. Such channels 40 are machined, molded, or otherwise formed between the upper and lower plate sections 20, 25. Channels may also be formed by installation of a separate flowpath device into a cavity otherwise existing between the upper and lower plate sections 20, 25. Similarly, there are coolant channels 45 between the upper and lower plate sections 30, 35 of the rear cooling plate 15. A coolant inlet pipe 50 is connected to the coolant channels 45 of the rear cooling plate 15. Coolant flows through the inlet pipe 50 and through the coolant channels 45 in the rear cooling plate 15. Conduit 55 connects the coolant channels 45 of the rear plate 15 with the coolant channels 40 of the front cooling plate 10. Coolant flows from the conduit 55 and through the coolant channels 40 of the front plate 10 and then exits through coolant outlet 60.

Although conventional approaches to thermally managing a RESS assembly, such as those set forth above, do exist, there are nevertheless ongoing limitations to conventional methods and devices.

SUMMARY

In accordance with the teaching of the present invention, a thermal management component for a RESS assembly and a method of managing the temperature of a RESS battery module are disclosed.

In some of the various embodiments of the present application, provided is a thermal management component for a RESS assembly comprising (i) a frame having first and second portions separated by an intermediate portion, the intermediate portion defining a chamber extending away from and between the first and second portions; and (ii) a heat exchange plate in mechanical communication with at least the first and second portions of the frame, the heat exchange plate extending over the chamber. The chamber is configured to receive, contain, and direct flow through of at least one heat transfer fluid. The heat exchange plate has opposing first and second faces, both extending over the chamber. The heat exchange plate is configured to be in mechanical and thermal communication with a RESS battery module and in thermal communication with the at least one heat transfer fluid when the same is received, contained, and flowing through the chamber.

In some of the various embodiments of the present application, also provided is a method of managing the thermal energy of a RESS battery module. The provided method comprises (a) providing a thermal management component as described herein; and (b) circulating at least one heat transfer fluid through the component. In some embodiments, the provided method comprises reducing or maintaining thermal energy of a RESS battery module in thermal communication with a heat exchange plate by circulating heat transfer fluid having lower thermal energy than that of the heat exchange plate. In some embodiments, the provided method comprises increasing thermal energy of a RESS battery module in thermal communication with a heat exchange plate by circulating heat transfer fluid having higher thermal energy than that of the heat exchange plate.

BRIEF DESCRIPTION OF THE DRAWINGS

A more complete appreciation of the invention and the many embodiments thereof will be readily obtained as the same becomes better understood by reference to the following detailed description when considered in connection with the accompanying drawings, wherein:

FIG. 3A shows one example of an integrated thermal management component according to an embodiment of the present application, wherein FIG. 3B is a detail view of a portion of the component of FIG. 3A.

DETAILED DESCRIPTION

Figure 1:
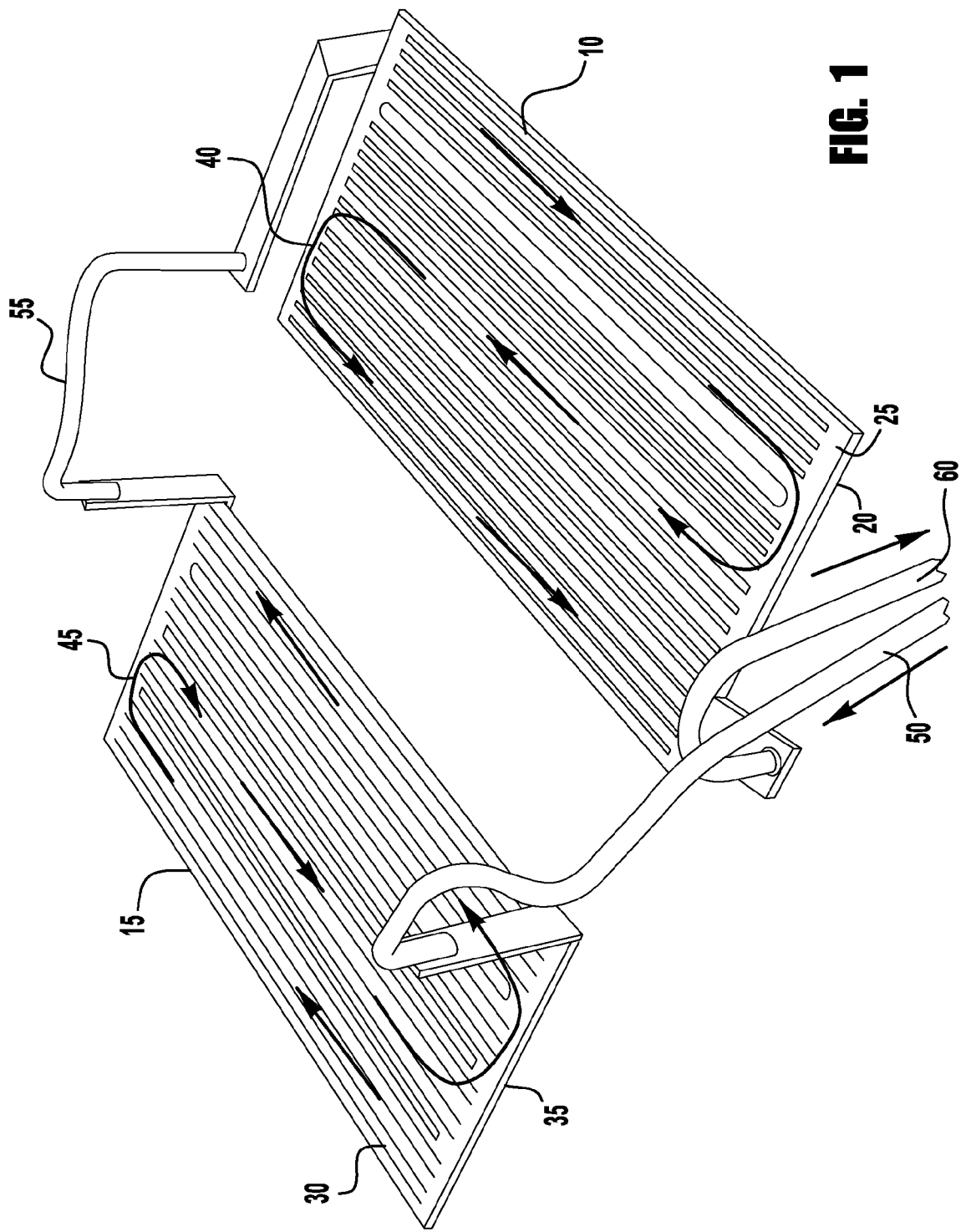
FIG. 1 is a view of one embodiment of a cooling assembly of the prior art.

Specific embodiments of the present disclosure will now be described. The invention may, however, be embodied in different forms and should not be construed as limited to the embodiments set forth herein. Rather, these embodiments are provided so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the specification and appended claims, the singular forms "a," "an," and "the" are intended to include the plural forms as well, unless the context clearly indicates otherwise.

It is noted that terms like "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is noted that the term "system" is utilized herein to represent a combination of components and individual components, regardless of whether such system is combined with other systems. For example, a "system" according to the present invention may comprise an electrochemical conversion system or fuel cell system, a vehicle incorporating an electrochemical conversion system, and so forth.

It is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Thermal Management Component

In various embodiments of the present application, provided is a thermal management component for a RESS assembly. The provided component comprises (i) a frame having first and second portions separated by an intermediate portion, the intermediate portion defining a chamber extending away from and between the first and second portions; and (ii) a heat exchange plate in mechanical communication with at least the first and second portions of the frame, the heat exchange plate extending over the chamber. The chamber is configured to contain flow of at least one heat transfer fluid. The heat exchange plate is configured to be in mechanical and thermal communication with a RESS battery module and in thermal communication with the at least one heat transfer fluid when the same is received, contained, and flowing through the chamber. As used herein, "heat transfer fluid" means a fluid, gas, or other flowable medium.

In some embodiments, the present application is directed to thermal management components that, when used as part of an operable thermal management system, function to cool a RESS assembly. In such embodiments, the at least one heat transfer fluid will be selected from coolants. For purposes of illustration, the following disclosure will refer to such a component, fluid, and system. However, the invention may be embodied in different forms and should not be construed as limited to such embodiments. For example, embodiments wherein the thermal management component is configured to be used as part of an operable system that functions to heat or maintain temperature of a RESS assembly are specifically contemplated to be within the scope of the present application, as are heat transfer fluids that are not coolants.

The provided thermal management component enables the integration of various RESS cooling components in order to improve the overall operability of the RESS and the thermal management system. For example, the provided component may provide one or more of reduced part count, increased manufacturability, additional package volume for additional energy, and higher reliability than conventional thermal management components. One particular embodiment of the provided component involves a molded RESS frame, where the coolant paths may be directly formed into the frame and capped off with a heat exchange plate that is in thermal communication with various RESS battery modules or cells. In one form, the coolant paths are formed into the frame by direct casting or molding (for ease of understanding, the term "molding" will be used to refer to molding, casting, or other methods of integrally making the cooling paths as part of the enclosure).

Figure 2:
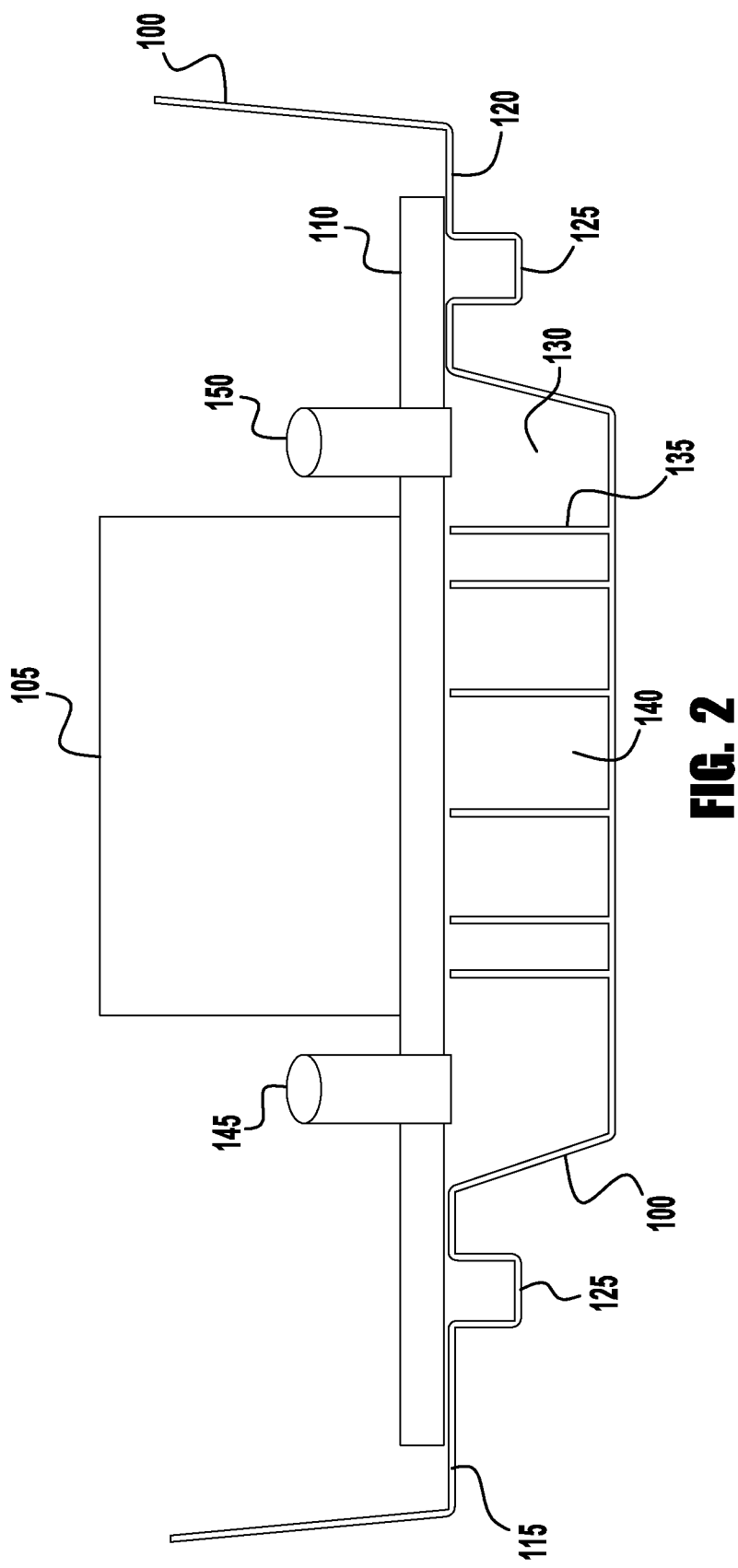
FIG. 2 shows a view of one example of a thermal management component according to an embodiment of the present application.

Embodiments of one example of a provided thermal management component are schematically described in FIG. 2. A frame 100 (which may be, but is not required to be, a RESS enclosure) may be made from a suitable structural material, such as a cast metal, machined metal, or molded plastic. In some embodiments, the frame may be load-bearing for the module 105 of the RESS. The frame 100 may exist in a variety of geometric conformations, provided that certain elements are maintained, and it may be separate from or integrated with other vehicle parts. Thus, the provided component offers flexibility in overall design and configuration, and provides freedom from certain constraints that exist with conventional RESS thermal management components. In one embodiment, the frame 100 and the cooling system (comprising a heat exchange plate 110 and a chamber 130 for containing at least one heat transfer fluid) may be integrated with a structure that contains the RESS assembly.

The frame 100 comprises at least first and second portions 115, 120 to which a heat exchange plate 110 is mounted. In some embodiments, the first and second portions 115, 120 may be flat surfaces in the same plane, thereby promoting ease of connection and reduction in assembly or manufacturing difficulties. The heat exchange plate 110 may be made by stamping or casting, for example, and may be mechanically attached to the frame 100 using screws, bolts, adhesives, welding, or other conventional means, as known to those skilled in the art. The plate 110 may be, but is not required to be, substantially planar. It is contemplated that a gasket, o-ring, or sealant may be disposed between the first and second portions 115, 120 and the heat exchange plate 110 to form a seal therebetween. Optionally, the frame 100 can include a groove 125 for a sealant, o-ring, or gasket. The surface of the heat exchange plate 110 defines a relatively large surface area that is in thermal communication with a comparably large surface of the heat-generating RESS modules 105. In one particular form, the thermal communication is established by mounting the RESS modules 105 directly onto the heat exchange plate 110 to establish direct, physical contact therebetween. Accordingly, in some embodiments, the heat exchange plate 110 may be load-bearing for the module 105 of the RESS.

Between the first and second portions 115, 120 of the frame 100, an intermediate portion (not labeled) of the frame 100 extends away from the plane of the first and second portions 115, 120 in a direction opposite to the RESS modules 105, thereby defining a chamber 130. The chamber 130 may, but is not required to, include one or more flow path structures 135 defining a flow path 140 for at least one heat exchange fluid. In some embodiments, the one or more flow path structures 135 are molded into the frame 100, thereby reducing the part count. The optional structures 135 may define discrete channels for flow of heat exchange fluid; may be bodies that serve to divert or disrupt flow of heat exchange fluid; may be bodies that keep one heat exchange fluid separate from another; or combinations thereof. For example, it is contemplated that the structures 135 may be walls molded into or mechanically attached to the frame 100, the walls defining discrete channels for directing the flow path 140 of at least one heat exchange fluid. It is further contemplated that such discrete channels may be configured to keep one heat exchange fluid separate from another heat exchange fluid while flowing through the chamber 130 (such as for a system having two closed loop flow paths). As another example, it is contemplated that the structures 135 may be walls, partial walls, or other bodies molded into or mechanically attached to the frame 100 and that serve to disrupt the flow of heat exchange fluid in the chamber 130, thereby increasing residence time within the chamber 130 and contact with the heat exchange plate 110 before exiting the chamber 130. Regardless of the presence of, or type of, flow path structure 135 comprised in the chamber 130, the thermal management component additionally comprises at least one inlet and outlet 145, 150 in fluid communication with the chamber 130, thereby providing points of entry and exit for the at least one heat exchange fluid. In some embodiments, as shown in FIG. 2, the inlet and outlet 145, 150 may be fully or partially integrated with (such as by molding), or mechanically attached to, the heat exchange plate 110. However, it is also contemplated that the inlet and outlet 145, 150 may alternatively be distinct from the heat exchange plate 110 and be in fluid communication with the chamber 130 without contacting the heat exchange plate 110.

As part of a thermal management system, the provided thermal management component is in mechanical and thermal communication with a RESS battery module and, in some embodiments, may also at least partially support the RESS battery module. It is also contemplated that other components of a RESS system in need of thermal management may also benefit from the present thermal management component and the efficient heat exchange relationship enabled thereby. For example, components such as a battery disconnect unit, a battery controller module, and a battery sensing module, as well as other controllers, contactors and electrical devices or heat sinks (none of which are shown) may also be mounted against the heat exchange plate of the provided component in order to facilitate heat transfer therebetween. It will be understood by those skilled in the art that the present invention is equally applicable to situations where it is necessary to carry heat to a component rather than to convey it away, and that the direction of heat flow is not destructive of the novelty of the present invention.

In the embodiment depicted in FIG. 2, the thermal management of the battery module 105 made possible by the provided component occurs from heat exchange at a single side (in particular, the bottom) of the module 105. Although not shown, the provided component may be extended to provide multiple-sided heat exchange. For example, the bottom and one or more sides of the module 105 may be in mechanical and thermal communication with the heat exchange plate 110, the heat exchange plate 110 and frame 100 being configurable for the same.

Referring to FIG. 3, illustrated are embodiments of another example of a provided thermal management component. Shown is a frame 200 having first and second portions 205, 210 separated by an intermediate portion 215, the intermediate portion 215 defining a chamber 220 extending away from and between the first and second portions 205, 210. Mechanically attached to the frame 200, at least at the first and second portions 205, 210, is a heat exchange plate 225. The heat exchange plate 225 has two opposing faces (not labeled) and extends over the chamber 220, and it may be attached to the frame 200 by bolts, screws, sealants, or other mechanical attachment means. In some embodiments, it is contemplated that mechanical attachment may be selected from permanent or reversible. Optionally, a gasket, o-ring, or sealant (none of which are shown) may be disposed between the heat exchange plate 225 and the frame 200. The thermal management component also comprises an inlet and outlet 230, 235 in fluid communication with the chamber 220. As shown, the inlet and outlet 230, 235 are at least partially integrated with the heat exchange plate 225.

In operation, at least one heat exchange fluid enters the component through an inlet 230, 235 and flows to and through the chamber 220 before exiting through an outlet 230, 235. Flow of the heat exchange fluid may be controlled by at least one flow control device, such as a fan or pump, said flow control device being in communication with the thermal management component. As it flows through the chamber 220, the at least one heat exchange fluid is in thermal communication with the heat exchange plate 225, and a transfer of thermal energy between the heat exchange plate 225 and the at least one heat exchange fluid occurs. In some embodiments, thermal energy is absorbed by the at least one heat exchange fluid from the heat exchange plate 225, thereby lowering the thermal energy of the heat exchange plate 225. In such embodiment, if a RESS assembly (not shown) were in thermal communication with the heat exchange plate 225, the thermal energy of the RESS assembly would lower (or be maintained at a steady state) as thermal energy is transferred from it to the heat exchange plate 225 and then to the at least one heat exchange fluid. In some embodiments, thermal energy is released by the at least one heat exchange fluid to the heat exchange plate 225, thereby increasing the thermal energy of the heat exchange plate 225. In such embodiment, if a RESS assembly (not shown) were in thermal communication with the heat exchange plate 225, the thermal energy of the RESS assembly would increase (or be maintained at a steady state) as thermal energy is transferred from the at least one heat exchange fluid to the heat exchange plate 225 and then to the RESS assembly.

Figure 4:
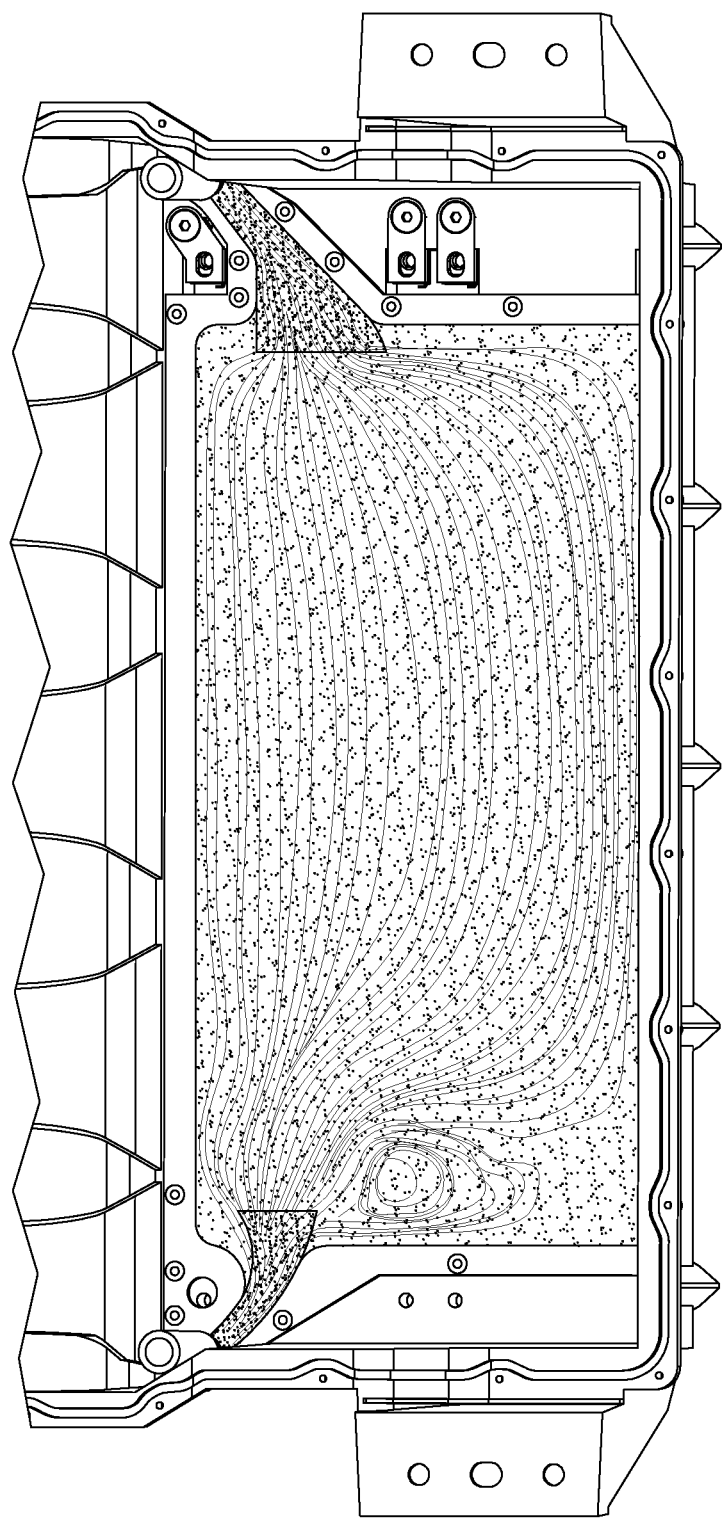
FIG. 4 illustrates certain embodiments of a thermal management component according to the present application.

In some embodiments, the chamber 220 may comprise one or more flow path structures (not shown) molded therein. Such flow path structures may be configured to increase the residence time of the at least one heat exchange fluid in the chamber 220; to disrupt or divert the flow of the heat exchange fluid; to increase the contact surface area with the heat exchange plate 225; to define discrete channels for directing flow of heat exchange fluid; or combinations thereof. Accordingly, the provided component provides thermal management flexibility for specific RESS needs. This is illustrated in FIG. 4, which shows a variety of flow path options for a heat exchange fluid. In certain embodiments, aspects of Computational Fluid Dynamics (CFD) may be used to design fluid flow paths. Thus, customized and cost-effective options for a RESS thermal management system may be provided.

Method of Thermal Management

In various embodiments of the present application, also provided is a method of managing the thermal energy of a RESS battery module. The provided method comprises (a) providing a thermal management component; and (b) circulating at least one heat transfer fluid through the component. The thermal management component comprises (i) a frame having first and second portions separated by an intermediate portion, the intermediate portion defining a chamber extending away from and between the first and second portions; and (ii) a heat exchange plate in mechanical communication with at least the first and second portions of the frame, the heat exchange plate extending over the chamber and in thermal communication with a RESS battery module.

In various embodiments of the provided method, circulation of the at least one heat exchange fluid through the component involves causing the fluid to enter the thermal management component through an inlet and flow to and through the chamber before exiting through an outlet. Flow of the heat exchange fluid may be controlled by at least one flow control device, such as a fan or pump, said flow control device being in communication with the thermal management component. In some embodiments, the method comprises causing a transfer of thermal energy between the heat exchange plate of the component and the at least one heat exchange fluid. By ensuring that as it flows through the chamber, the at least one heat exchange fluid remains in thermal communication with the heat exchange plate, a transfer of thermal energy between the heat exchange plate and the at least one heat exchange fluid can occurs. As a change in the thermal energy of the heat exchange plate occurs, a transfer of thermal energy between the RESS battery module and the heat exchange plate may also occur.

In some embodiments, the provided method comprises lowering (or maintaining at a steady state) the thermal energy of a RESS battery module by transferring thermal energy from the RESS battery module to the heat exchange plate in thermal communication therewith. In turn, the thermal energy of the heat exchange plate may be absorbed by the at least one heat exchange fluid in thermal communication therewith.

In some embodiments, the provided method comprises raising (or maintaining at a steady state) the thermal energy of a RESS battery module by transferring to the heat exchange plate thermal energy from the at least one heat exchange fluid in thermal communication therewith, and transferring thermal energy from the heat exchange plate to the RESS battery module in thermal communication therewith.

As one of skill in the art will appreciate, the method may comprise providing any thermal management component as described in this application and circulating at least one heat exchange fluid therethrough.

Having described the provided thermal management component and method of managing the thermal energy of a RESS battery module in detail and by reference to specific embodiments thereof, it will be apparent that modifications and variations are possible without departing from the scope of the invention defined herein and in the appended claims.

What is claimed is:

1. A rechargeable energy storage system assembly for thermal management of a module by heat exchange at a single side of the module comprising:
   a plurality of individual battery cells combined within the module to define a rechargeable energy storage system; and
   a module support structure comprising:
   (i) a frame having first and second portions separated by an intermediate portion, the intermediate portion defining a chamber extending away from and between the first and second portions;
   wherein the chamber is configured to receive, contain, and direct flow of at least one heat transfer fluid; and
   (ii) a generally planar heat exchange plate in mechanical communication with at least the first and second portions of the frame, the heat exchange plate extending over the chamber;
   wherein the heat exchange plate of the module support structure is configured to be in mechanical and thermal communication with the single side of the module that rests entirely on top of the heat exchange plate; and the chamber is under the heat exchange plate.

2. The rechargeable energy storage system assembly of claim 1, comprising at least one flow path structure in the chamber, the at least one flow path structure defining a flow path for the at least one heat transfer fluid.

3. The rechargeable energy storage system assembly of claim 2, wherein the at least one flow path structure is molded in the intermediate portion of the frame and is selected from bodies defining flow channels for the at least one heat transfer fluid to divert or disrupt flow of the at least one heat transfer fluid to maintain separation between the at least one heat transfer fluid; or combinations thereof.

4. The rechargeable energy storage system assembly of claim 1, comprising at least one inlet and at least one outlet in fluid communication with the chamber.

5. The rechargeable energy storage system assembly of claim 1, wherein the frame comprises a groove in at least one of the first or second portions, the groove containing a gasket, o-ring, sealant, or combination thereof.

6. The rechargeable energy storage system assembly of claim 1, wherein the heat exchange plate is mechanically attached to the at least first and second portions of the frame by one or more of screws, bolts, adhesives, or welds.

7. A rechargeable energy storage system assembly for thermal management of a module by heat exchange at a single side of the module comprising:
   a plurality of individual battery cells combined within the module to define a rechargeable energy storage system; and
   a module support structure comprising:
   (i) a frame having substantially planar first and second portions separated by an intermediate portion, the intermediate portion extending away from the planar first and second portions and defining a chamber having at least one flow path structure molded therein; and
   (ii) a generally planar heat exchange plate in mechanical communication with at least the first and second portions of the frame, the heat exchange plate having opposing first and second faces, both extending over the chamber;
   wherein the first face of the heat exchange plate is configured to be in mechanical and thermal communication with the single side of the module that rests entirely on top of the heat exchange plate; and the chamber is under the heat exchange plate.

8. The rechargeable energy storage system assembly of claim 7, wherein the chamber is configured to receive, contain, and direct flow of at least one heat transfer fluid; and wherein the second face of the heat exchange plate is configured to be in thermal communication with the at least one heat transfer fluid.

9. The rechargeable energy storage system assembly of claim 8, comprising at least one inlet and at least one outlet in fluid communication with the chamber.

10. The rechargeable energy storage system assembly of claim 9, wherein the frame comprises a groove in at least one of the first or second portions, the groove containing a gasket, o-ring, sealant, or combination thereof.

11. The rechargeable energy storage system assembly of claim 9, wherein the heat exchange plate is mechanically attached to the at least first and second portions of the frame by one or more of screws, bolts, adhesives, or welds.

12. A method for thermal management of a module of a rechargeable energy storage system by heat exchange at a single side of the module comprising:
providing a plurality of individual battery cells combined within the module to define a rechargeable energy storage system;
providing a module support structure comprising:
(i) a frame having first and second portions separated by an intermediate portion, the intermediate portion defining a chamber extending away from and between the first and second portions, wherein the chamber is configured to receive, contain, and direct flow of at least one heat transfer fluid; and
(ii) a generally planar heat exchange plate in mechanical communication with at least the first and second portions of the frame;
configuring the heat exchange plate to be in mechanical and thermal communication with the single side of the module that rests entirely on top of the heat exchange plate, and the chamber is under the heat exchange plate; and circulating at least one heat transfer fluid through the provided module support structure, the at least one heat transfer fluid in thermal communication with the module of the rechargeable energy storage system and the heat exchange plate.

13. The method of claim 12, comprising reducing the thermal energy of the module of the rechargeable energy storage system by circulating heat transfer fluid having lower thermal energy than that of the heat exchange plate.

14. The method of claim 12, comprising increasing the thermal energy of the module rechargeable energy storage system by circulating heat transfer fluid having higher thermal energy than that of the heat exchange plate.

15. The method of claim 12, wherein the frame of the module support structure comprises at least one flow path structure in the chamber, the at least one structure defining a flow path for the at least one heat transfer fluid.

16. The method of claim 15, wherein the at least one flow path structure is a wall molded in the intermediate portion of the frame.

17. The method of claim 12, wherein the module support structure further comprises at least one inlet and at least one outlet in fluid communication with the chamber.

18. The method of claim 12, wherein the frame of the module support structure comprises a groove in at least one of the first or second portions, the groove containing a sealant, o-ring, gasket, or combination thereof.

19. The method of claim 12, wherein the heat exchange plate is mechanically attached to the first and second portions of the frame by screws, bolts, adhesives, or welds.

* * * * *